United States Patent [19]
Castner et al.

[11] Patent Number: 5,474,728
[45] Date of Patent: Dec. 12, 1995

[54] PROCESS FOR MAKING A TRAPEZOIDALLY-SHAPED OPENING IN A THERMOFORMED SHEET MATERIAL

[75] Inventors: Glenn C. Castner, Victor; Keith A. Messinger, Canandaigua; Donald E. Rowe, Newark, all of N.Y.

[73] Assignee: Mobil Oil Corporation, Fairfax, Va.

[21] Appl. No.: 273,246

[22] Filed: Jul. 11, 1994

[51] Int. Cl.⁶ ............................. B29C 43/40; B29C 51/32
[52] U.S. Cl. ........................ 264/155; 264/163; 264/322
[58] Field of Search ............................ 264/154, 155, 264/156, 163, 322

[56] References Cited

U.S. PATENT DOCUMENTS

| 4,155,692 | 2/1979 | Kermoian | 425/292 |
| 4,446,088 | 5/1984 | Daines | 264/155 |
| 4,909,721 | 3/1990 | Warburton | 425/289 |
| 5,162,123 | 11/1992 | Grimes | 425/292 |

Primary Examiner—Leo B. Tentoni
Attorney, Agent, or Firm—Alexander J. McKillop; George W. Hager, Jr.; Clinton H. Hallman, Jr.

[57] ABSTRACT

The invention relates to a mold apparatus and a process for forming a lid latching mechanism in a thermoplastic container. The lid latching mechanism features a large, trapezoidally-shaped opening hole. The trapezoidal shape has been found to reduce the amount of tearing that can occur along the edges of an opening formed during the thermoforming process. The opening is created by the engagement between a fixed shear key mounted in a first mold member and a movable shear key which has a trapezoidally-shaped cutting surface and is mounted in a second mold member. The movable key travels along an inclined path as the mold members close on a preheated thermoplastic sheet to form a container.

12 Claims, 6 Drawing Sheets

5,474,728

PROCESS FOR MAKING A TRAPEZOIDALLY-SHAPED OPENING IN A THERMOFORMED SHEET MATERIAL

FIELD OF THE INVENTION

The present invention relates to a mold apparatus, and a process for creating a lid latching mechanism for a thermoplastic article featuring a large trapezoidally-shaped opening.

BACKGROUND OF THE INVENTION

In accordance with the present invention, a mold, method and improvement process are provided for creating a large, trapezoidally-shaped opening in a thermoformed container. Thermoformed containers have gained wide acceptance for use as food containers for single use. These disposable containers serve as storage, transport and serving means for a wide range of various comestibles. Their use ranges widely from so called "take-out" establishments to "fast food" retail restaurants. The containers are constructed from a thermoplastic material, such as foamed polystyrene or the like and generally comprise a tray member adapted to receive the comestibles and a hingedly connected cover member which is held closed by some type of latching mechanism. The efficacy of the latching mechanism has a great influence on the performance of the container and its acceptance by customers. Latching mechanisms that hold the cover closed very securely tend to be difficult for customers to open for access to the comestibles therein. Conversely, latching mechanisms that are easily opened are prone to accidental opening while being transported leading to spillage of the contents and extremely negative customer reactions to the container. Therefore latch design and particularly the size of the opening used for a latch have required a compromise between providing a secure closure and a easy to open closure.

The ability to create latching mechanism openings during the thermoforming process is well known in the art of making thermoformed containers. In fact, in-mold perforation of latching mechanism openings has largely replaced the use of post forming punching operations.

U.S. Pat. No. 4,909,721 to Warburton describes a male and female mold parts combination for forming a latch opening in a thermoplastic container. The mold features a female mold key and a male mold key, a cutting edge adjacent to a planar face of one key and a vertical surface having a beveled edge surface on the other key. As the mold halves come together during the thermoforming process the cutting edge of one key engages and rides off the beveled edge surface of the other key and then slides across the vertical surface piercing and enlarging a latch opening in the thermoplastic material. The two keys that create the opening assume a contacting parallel relationship during their engagement.

U.S. Pat. No. 4,446,088 to Daines, the contents of which are incorporated herein in its entirety, describes a process and a mold for the production of a thermoformed carton. The patent discloses a male cutting key having a flat cutting surface parallel to the closing motion between a male mold member and a female mold member. It further discloses a female key having a flat cutting surface which is also parallel to the closing motion between the male and female mold members. A biasing means urges the flat surfaces of the male and female keys against each other to create a latch opening as the male and female mold members close on a preheated thermoplastic sheet. In this mold and process the male key is movably mounted in the male mold so as to travel a path perpendicular to closing motion.

Vertical shearing is also utilized in U.S. Pat. No. 4,155,692 to Kermoian which describes a mold for forming in one operation a container with a latch opening and a reinforces area adjacent thereto. Shearing and removal of the sheared sheet is accomplished by the vertical movement of a shear bar past a vertically aligned die face during compression of the male and female mold members. The shear bar entrains a portion of the thermoplastic sheet being formed and moves it downwardly into a cavity of where it is compressed into an area adjacent to the latch opening.

A spring-oriented rotary shear key is used in the mold described in U.S. Pat. No. 5,162,123 to Grimes. Here again two shear keys, an upper key and a lower key, are used to create a latch opening during the vertical closing of two mold members. The lower key is pivotally mounted on a pivot pin extending along an axis normal to the path of travel of the of the mold members.

However, all of the teachings of those patents require that the cutting action be accomplished via the sliding, parallel engagement of two vertically aligned shear keys. All shear key movement is either parallel or perpendicular to the motion of closing of the mold members. While each of these inventions will cut an opening in a thermoformed container, they have common disadvantages and limitations. A particular disadvantage is that the edges of the resulting latch openings tend to cause some amount of tearing as the opening is formed. Ragged edges on the latch opening affect the operability, and customer acceptance of the finished product. A significant limitation on the vertical/parallel approach is the size of the opening created. None of the prior art described herein above produces an opening that is simultaneously very wide and very tall. The maximum height of the opening created by each of the prior art patents discussed above is about 9.53 mm (⅜ in). Widths far in excess of that dimension have been obtained, however, the openings have always been limited to the 9.53 mm height dimension.

The limitations on latch opening height and width have indirectly limited the size of the protrusion or button that extends through the latch opening. These protrusions are typically pushed through the latch opening by the users thumb as a container is opened. Containers having buttons that are very much smaller than the area of a user's thumb can be difficult to open. There is therefore a need in the art for an easy to open latching mechanism that provides a secure container closure and has a large protrusion or button providing ease of customer use.

SUMMARY OF THE INVENTION

This invention relates to a mold apparatus and a process for creating a thermoformed container latching mechanism having at least one large, trapezoidally-shaped opening. The opening is created by the engagement between a novel movable shear key having a trapezoidally-shaped cutting surface and a fixed shear key having a cutting edge. The latching mechanism thus formed has a large protrusion which is easily operated by the user. The opening of this latching mechanism is free of tearing along its angled sides. It is believed that the trapezoidal shape plays a major role in the very clean cut that is achieved with this invention.

This invention comprises a mold apparatus comprising a first mold member, a second mold member, a transport means for moving a preheated thermoplastic sheet between the mold members and a closing means for bringing the first and the second mold members into contact with the preheated thermoplastic sheet to form a thermoplastic article. The first mold member has a fixed shear key mounted therein. The fixed key has at least one cutting edge defined by the intersection of a first horizontal key surface coplanar with the first mold member and a first inclined key surface. The first inclined surface is angled to the direction of closure of the first and second mold members at an acute angle. There is a movable shear key mounted in the second mold member, the key having a trapezoidally-shaped, flat cutting surface and a beveled guide surface adjacent to said cutting surface, wherein the second key is movable along an inclined path in the second mold member. The path is inclined at an acute angle relative to the second mold member. The invention also includes a bias means for urging the movable shear key cutting surface against the fixed shear key cutting edge. During the forming of a thermoplastic article, the fixed shear key cutting edge contacts the movable shear key on the beveled guide surface and slides downwardly across the trapezoidally-shaped, flat cutting surface so as to push the movable shear key along the inclined path in the second mold member and cut a large, trapezoidally-shaped opening in the thermoplastic article. The opening has two angled sides and is substantially free of tearing along each angled side. The fixed first key inclined surface is nonparallel to the trapezoidally-shaped cutting surface of the movable second shear key.

The present invention further includes a second horizontal key surface substantially parallel to the first horizontal key surface and a second inclined key surface substantially parallel to the first inclined surface. The horizontal and inclined key surfaces intersect to further define three additional cutting edges. Given its symmetrical shape, the fixed shear key is reversible within the first mold member such that each of four cutting edges contained thereon may be exposed in turn. The advantage of this type of fixed shear key is that all four cutting edges of the key may be used before the key must be removed for sharpening. Accordingly, the frequency with which the thermoforming process production must be interrupted for maintenance is reduced by a large factor. The costs to operate and maintain the mold apparatus are greatly reduced.

It is therefore an object of this invention to provide a latching mechanism for thermoformed containers that utilizes a large, trapezoidally-shaped opening to receive the latch button.

It is another object of this invention to provide a latch opening in a thermoformed container that is free of tearing along the sides of the opening.

It is a further object of this invention to provide a mold apparatus having a movable shear key that travels in the mold assembly along a path which is inclined to the mold apparatus.

It is still another object of this invention to provide a container having at least one large trapezoidally-shaped latch opening. The opening has a height of about 13.6 mm and tapers in width from 12.7 mm to 25.4 mm from top to bottom.

The foregoing and other objects, features and advantages of the invention will be better understood from the following more detailed description and appended claims.

BRIEF DESCRIPTION OF THE DRAWINGS

Reference may now be had to the following detailed description of an exemplary embodiment of the invention, taken in conjunction with the accompanying drawings, in which.

DETAILED DESCRIPTION OF THE INVENTION

Figure 1:
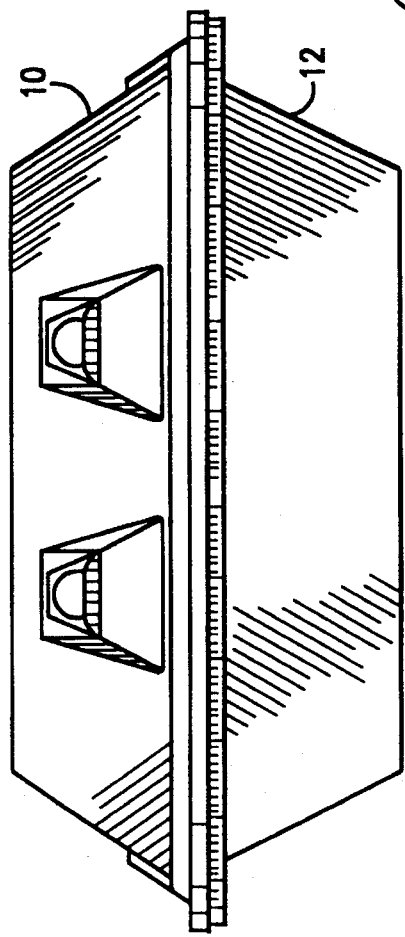
FIG. 1 shows a front elevation of a preferred embodiment of a container having the latching mechanism of the present invention.
Figure 2:
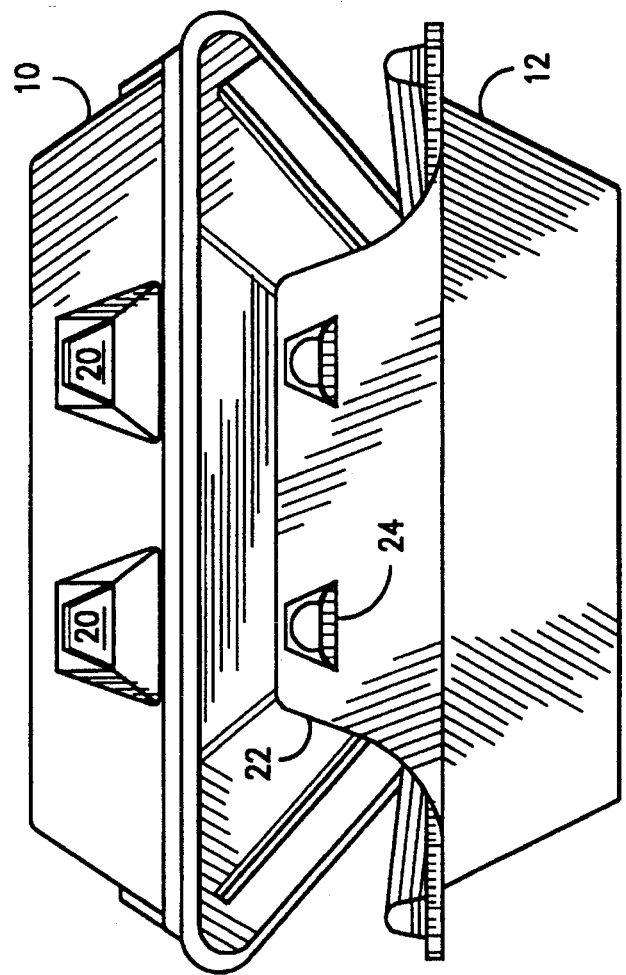
FIG. 2 is an elevation of the container of FIG. 1 having the top half raised to show the latching protrusions.
Figure 3:
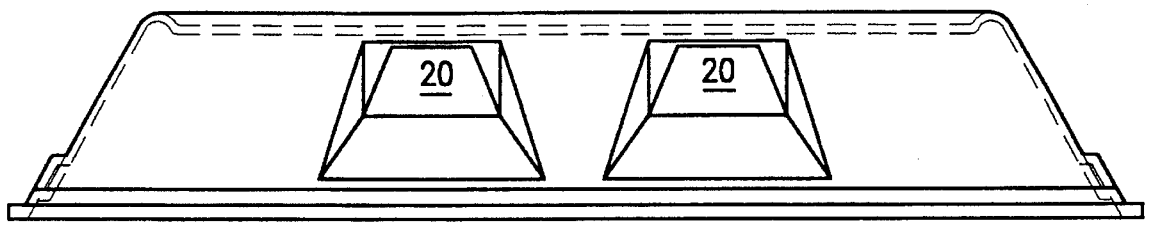
FIG. 3 is a close up elevation of the top half of the exemplary container showing the trapezoidally-shaped openings therein.

Referring to FIGS. 1–3, a preferred embodiment of a thermoplastic container having the latching mechanism of the present invention is shown. The container has an upper half 10 which is hingedly connected to a lower half 12. Each half has four walls which are upstanding walls for the lower half 12 and downwardly projecting walls for the upper half. The front wall of the lower half 12 has a latch flap 22 attached thereto. The latch flap 22 has two large protrusions or buttons 24 which correspond in size, shape and location to the novel trapezoidally-shaped openings 20 located in the front downwardly projecting wall of the upper half 10. FIGS. 1–3 show a container having two latching openings. However, the number of latch points used can vary with the size and use of the container as will be appreciated by one of ordinary skill in the art.

Figure 2A:
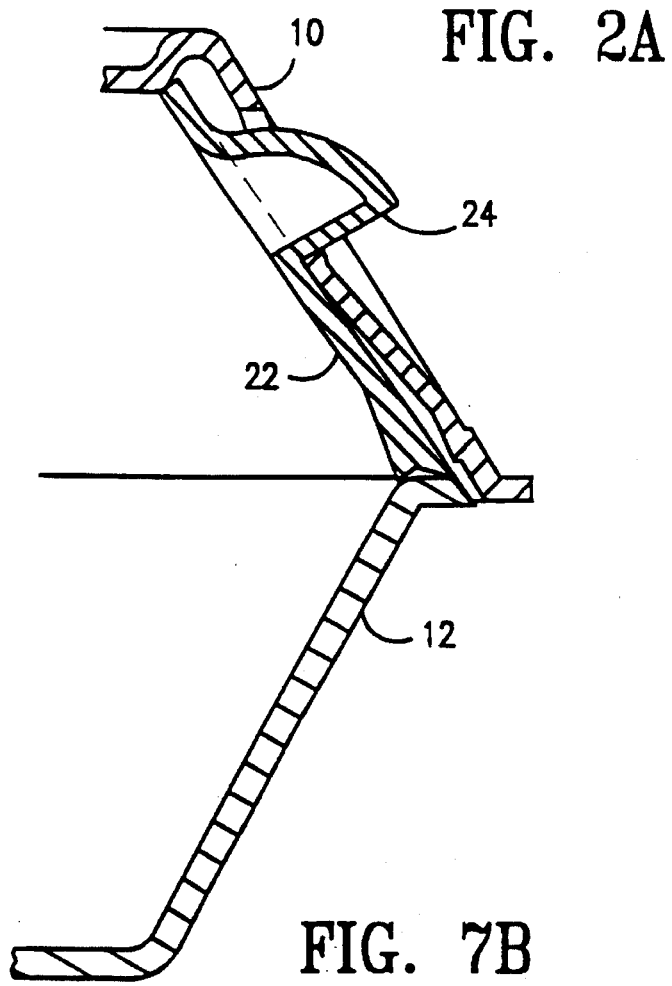
FIG. 2A is a section through the closed container at the latch protrusion.

FIG. 2A is a section taken through the latch button 24. It can be seen that in the closed position, the latching mechanism of the present invention provides a large protrusion 24 through the latch opening 20. This size protrusion provides a secure closure in addition to providing a large area for the customer to use to open the container. FIG. 3 is an isolated view of the two trapezoidally-shaped openings of this preferred embodiment of the present invention. The openings are unique in the art for their trapezoidal shape and also for their size. In the preferred embodiment, they have a height of about 13.6 mm and a width that tapers from about 12.7 mm to about 25.4 mm from top to bottom.

Figure 7A:
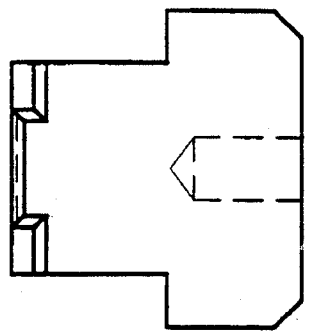
FIGS. 7A, 7B and 7C show side, front and top views respectively of the moveable male shear key of the present invention.
Figure 7B:
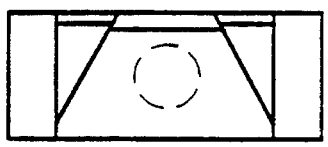
Figure 7C:
Figure 3A:
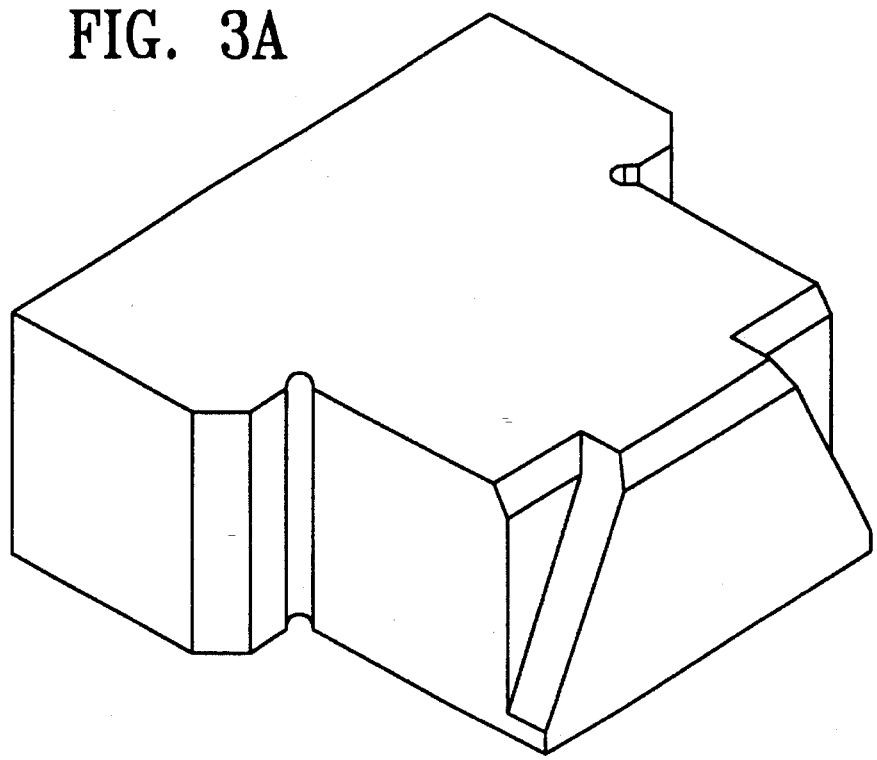
FIG. 3A is a perspective view of the movable key of the present invention.
Figure 3B:
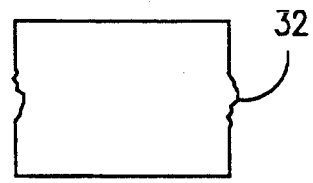
FIG. 3B is a view of a prior art opening having tearing along the sides thereof.
Figure 3C:
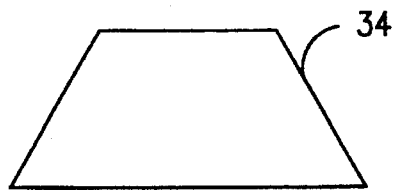
FIG. 3C is a view of the trapezoidally-shaped opening of the present invention.

The problem encountered with prior art methods for creating a latching mechanism opening is illustrated in FIG. 3B where it can be seen that while a clean cut was achieved along the top and bottom edges, tearing occurs along the sides of the opening. Attempts to increase the size of the square or rectangular opening typical in the prior art were very unsuccessful as the increased size of the opening exacerbated the tearing problem. It was not possible to double the height of those kinds of openings while producing acceptable products. However, it has been discovered that using a trapezoidally-shaped opening permits the creation of a large latching mechanism opening that is free of tearing along the sides of the opening. FIG. 3C is illustrative of the kind of cleanly cut opening formed by the mold apparatus and process of the present invention. The novel moveable shear key member used to create the trapezoidally-shaped opening is shown in FIG. 3A. As can be seen, the key has a flat, trapezoidal face responsible for the unique shape of latching mechanism opening. Side, front and top views of the key are shown in FIGS. 7A, 7B and 7C.

Figure 4:
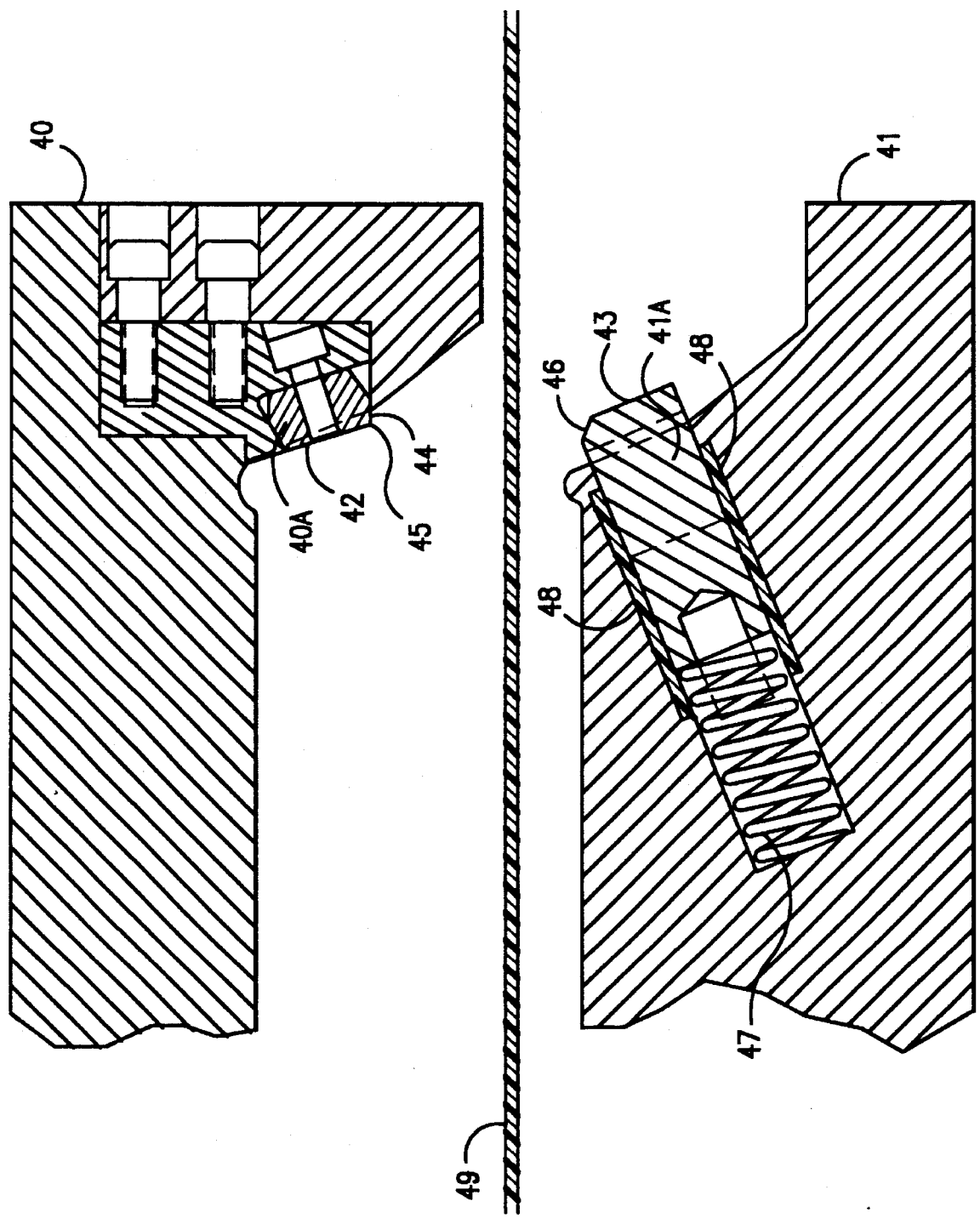
FIG. 4 is a section view of the mold apparatus in a fully open position showing the preheated thermoplastic sheet positioned therein.
Figure 5:
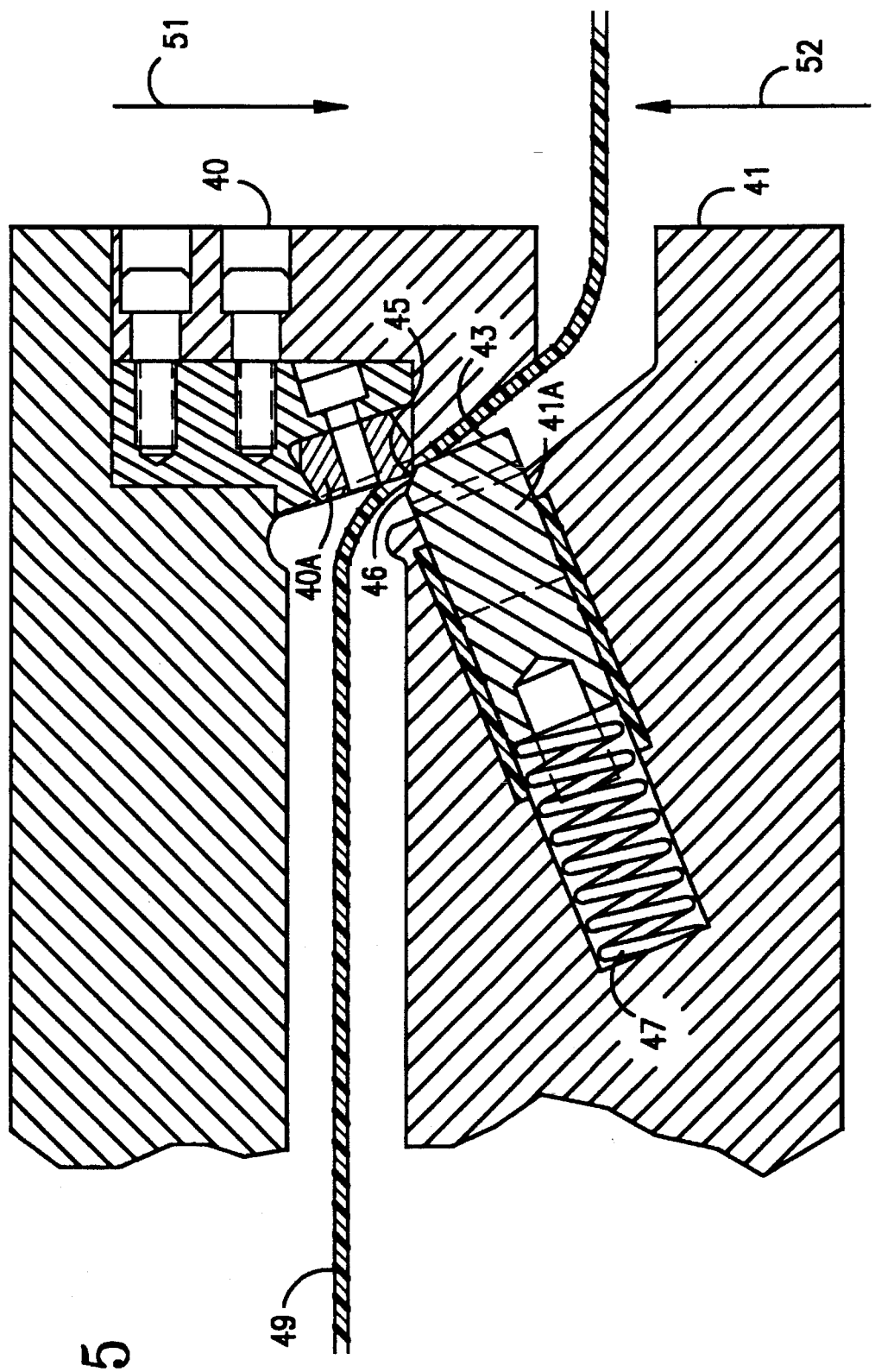
FIG. 5 is a section view of the mold apparatus in a partially closed position.
Figure 6:
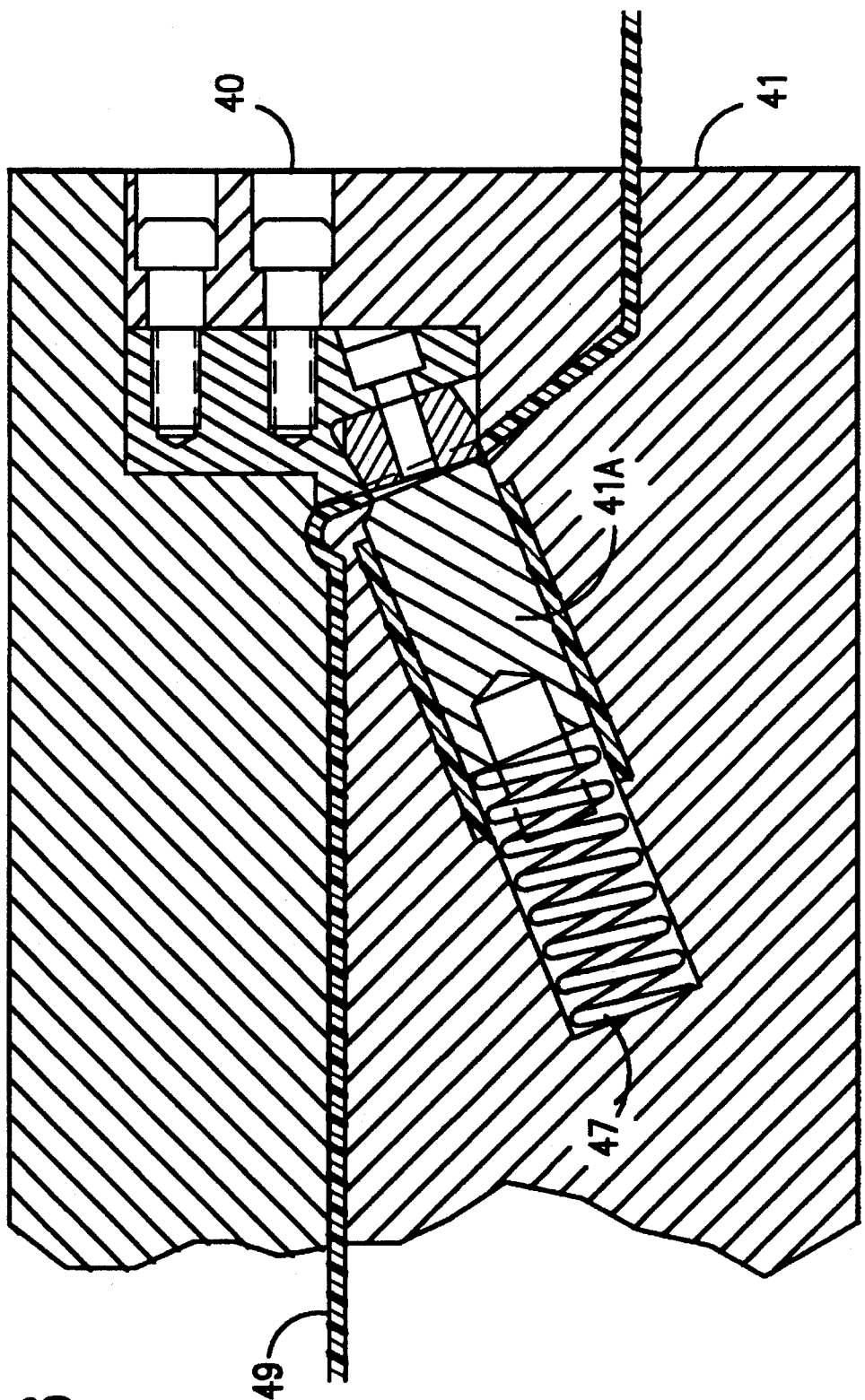
FIG. 6 is a section view of the mold apparatus in the fully closed position.

Referring now to FIGS. 4–6, the mold apparatus of the present invention can be seen to include a first mold member 40 and a second mold member 41. These members are also known in the art as a female mold member and a male mold member respectively. Either term will be used herein and should be understood to refer to the appropriate mold half. The members are closed with respect to the other by a closing means well known in the art and not shown here. Further there is provided a transport means to for moving a preheated thermoplastic sheet 49 between the mold members. Such transport means are also well known in the art and will not be explained in detail herein. It will also be observed that the two mold members, while having a number of angled and curved surfaces, generally define two parallel planes. These planes are parallel to the preheated thermoplastic sheet 49 on which the mold members close to form thermoplastic articles.

A fixed female shear key 40A is mounted in the first mold member. The fixed female key is secured in the mold in a way well known in the art. This key has a cutting edge 45 which actually pierces the preheated thermoplastic sheet 49 and cooperates with the moving male key 41A to form the opening therein. The cutting edge 45 is defined by the intersection of a first horizontal surface 44 and a first inclined surface 42. The first horizontal surface is parallel to and coplanar with the mold members. It should be understood that the cutting edge is the only part of the fixed female key that comes into contact with the movable key 41A as will be further explained herein below. The angle of the first inclined surface 42 is defined relative to the direction of closing of the mold members onto the sheet as shown by arrows 51 and 52 in FIG. 5. Preferably the first inclined surface forms an acute angle with the direction of closing. Still more preferably the first inclined surface forms an angle of about 17.5 degrees relative to the direction of closing. It should be understood that the direction of closing is substantially perpendicular to the plane defined by the mold members.

Figure 8A:
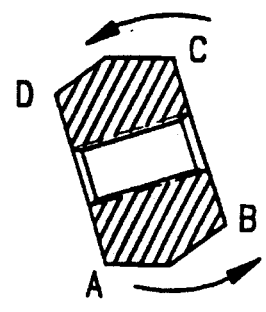
FIGS. 8A is an end view of the fixed female key of the present invention to include arrows showing the manner in which the key may be rotated within the mold to expose the cutting edges contained thereon.
Figure 8B:
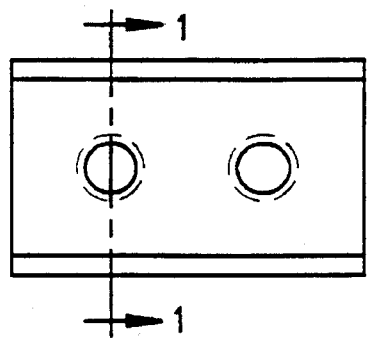
FIG. 8B is a side view of the fixed female key of the present invention.

A particularly novel aspect of the fixed female shear key 40A is shown in FIGS. 8A and 8B where the key is shown outside of the mold member at its exact orientation when installed in the mold. The fixed shear key can be seen to have a generally hexagonal shape in cross section. The first horizontal surface 44 has a corresponding, parallel second horizontal surface 44A on the opposite side of the key. In a similar fashion, the first inclined surface 42 has a corresponding parallel second inclined surface 42A. These surfaces intersect to form a second cutting edge 45A on the fixed female shear key. As will be readily appreciated by one of ordinary skill in the art, the symmetry of the fixed female shear key 40A produces a total of four cutting edges on the fixed shear key of the present invention. These cutting edges are shown at A, B, C and D in FIG. 8A. The presence of a plurality of cutting edges renders the key reversible permitting it to remain in use in the mold for a much longer period of time before the key must be removed for sharpening. As each cutting edge becomes dull the key can be rotated to expose in turn a fresh cutting edge. This novel key thus reduces operating and maintenance costs significantly.

Returning to FIG. 4 and to the second or male mold member 41, it can be seen that the novel movable male key 43 is positioned in the mold member at an angle to the mold plane. The key has a beveled guide surface 46 which is adjacent to a flat cutting surface 43. The flat cutting surface has the advantageous trapezoidal shape. The movable male key travels along a path in a cavity within the second mold member. Preferably this path is inclined at an acute angle to the second or male mold member. More preferably the path is inclined at an angle of 20 degrees to 30 degrees. Most preferably the path is inclined at an angle of about 22.5 degrees. A substantial amount of wear can take place as the movable shear key travels along the inclined path repeatedly during the thermoforming process. Accordingly, wear members 48 are positioned in recessed areas in the cavity to provide a durable, slick surface on which the movable male shear key may travel. A suitable material for the wear members is any long wearing, anti-friction substance acceptable for use at thermoforming temperatures. Such materials are well known in the art.

FIGS. 5 and 6 more particularly illustrate the operation of the mold apparatus and process of the present invention. In FIG. 5 arrows 51 and 52 show the direction of closing of the mold members 40 and 41 onto the thermoplastic sheet 49. The cutting edge 45 pierces the thermoplastic sheet 49 at the beveled guide surface 46 of the movable male key. The engagement of the fixed key 41A continues onto the flat cutting surface of the movable male key as the mold members continue to close. The cutting edge forms an opening as it travels along the trapezoidally-shaped flat surface 43 and simultaneously causes the movable male key 41A to travel along its inclined path. The two keys are held in firm engagement by a biasing means. In the preferred embodiment shown in FIGS. 4–6 that biasing means is a spring 47.

As can be appreciated in FIG. 6, when the mold members are fully closed an opening has been formed in the thermoplastic container by the action of the fixed and movable shear keys. When the mold apparatus is in the fully closed position the first inclined surface 42 is adjacent to but is not parallel to the flat cutting surface 43 of the movable male shear key 41A. There is a very small angle between those two surfaces. Therefore, during the entire travel of the fixed shear key 40A along any part of the movable male key 41A only the cutting edge 45 contacts the movable key 41A.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A process for forming a trapezoidally-shaped opening in a thermoplastic article comprising:

providing a sheet of thermoplastic material, the material preheated to at least a thermoforming temperature;

drawing the preheated sheet between a male mold member having a movable male shear key and a female mold member having a fixed female shear key;

cutting a large, trapezoidally-shaped opening in the preheated sheet as the male mold member and the female mold member are closed on the preheated sheet by the sliding contact between a cutting edge of the female key and a trapezoidally-shaped flat cutting surface of the male key, the cutting edge of the female key defined by the intersection of a first horizontal key surface coplanar with the female mold and a first inclined key surface, said first inclined key surface being angled to the direction of closure of the male and female mold members at an angle of 17.5 degrees;

wherein the male key is movable along an inclined path in the male mold member, said path inclined at an acute angle relative to the male mold member, the male key being biased against the female key.

2. The process of claim 1 wherein the fixed shear key further comprises a second horizontal key surface substantially parallel to the first horizontal key surface; and a second inclined key surface substantially parallel to said first inclined surface, the horizontal and inclined key surfaces intersecting to further define three additional cutting edges.

3. The process of claim 2 wherein the inclined path of the movable shear key is inclined at an angle of 20 to 30 degrees relative to the male mold member.

4. The process of claim 3 wherein the inclined path of the movable shear key is inclined at an angle of 2.5 degrees relative to the male mold member.

5. The process of claim 4 wherein the trapezoidally-shaped opening has a height of 13.6 mm and a width that tapers from 12.7 mm to 25.4 mm from top to bottom.

6. The process of claim 5 wherein the fixed shear key is reversible within the first mold member so as to expose each of the cutting edges.

7. In a process for the production of a thermoformed thermoplastic article including the steps of preheating a sheet of thermoplastic material, thermoforming the preheated sheet between a male and a female mold member, and shearing a hole in the sheet by the engagement of a male key positioned in said male mold member and a female key in the female mold member, the male key biased against the female key, the improvement comprising:

mounting a fixed, inclined female key in the female mold member, the female key having a cutting edge defined by the intersection of a first horizontal key surface coplanar with the female mold member and a first inclined key surface, said first inclined surface angled to the direction of closing of the male and female mold members at an angle of 17.5 degrees;

mounting a movable, inclined male key in the male mold member, the male key having a trapezoidally-shaped, flat cutting surface, wherein the male key is inclined relative to the male mold member at an acute angle, the male key biased against the female key such that the female key cutting edge makes sliding contact with the male key trapezoidally-shaped, flat cutting surface to cut a large, trapezoidally-shaped opening in the article during the thermoforming process.

8. The improvement of claim 7 wherein the fixed shear key further comprises a second horizontal key surface substantially parallel to the first horizontal key surface; and a second inclined key surface substantially parallel to said first inclined surface, the horizontal and inclined key surfaces intersecting to further define three additional cutting edges.

9. The improvement of claim 8 wherein the inclined path of the movable shear key is inclined at an angle of 20 to 30 degrees relative to the male mold member.

10. The improvement of claim 9 wherein the inclined path of the movable shear key is inclined at an angle of 22.5 degrees relative to the male mold member.

11. The improvement of claim 10 wherein the trapezoidally-shaped opening has a height of 13.6 mm and a width that tapers from 12.7 mm to 25.4 mm from top to bottom.

12. The improvement of claim 11 wherein the fixed shear key is reversible within the female mold member such that each of the cutting edges may be exposed in turn.

\* \* \* \* \*